Patented May 23, 1944

2,349,770

UNITED STATES PATENT OFFICE 2,349,770

PROCESS FOR THE PRODUCTION OF TETRA-SUBSTITUTED ETHYLENES

Frank H. Tendick, Grosse Pointe Park, Mich., assignor to Parke, Davis & Company, Detroit, Mich., a corporation of Michigan No Drawing. Application June 27, 1939, Serial No. 281,461

12 Claims. (Cl. 260—619)

The invention relates to the manufacture of hydroxy aryl-substituted unsaturated hydrocarbons and more particularly to the manufacture of di-hydroxyaryl di-alkyl substituted ethylenic compounds and new intermediate compounds useful for obtaining the same.

The starting materials of the present invention are di-hydroxyaryl di-alkyl substituted ethylene glycols. Such compounds are of the pinacol type. A surprising feature of the invention is that treatment of the phenolic-substituted glycols with acid does not cause the well-known pinacol rearrangement. Instead of forming a pinocoline by rearrangement of the pinacol and elimination of water, the glycols used in the present invention are converted by acids into oxides. The further steps of the process are to hydrogenate the oxide to a mono-hydric alcohol which, upon treatment with acid, loses water and yields the desired di-hydroxyaryl di-alkyl ethylene.

The transformations occur in a manner which can be represented diagrammatically as follows:

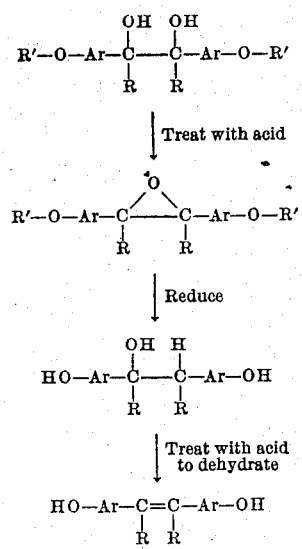

R in the above formula represents a saturated or unsaturated lower aliphatic hydrocarbon radical, while R'—O— represents a member of the group hydroxyl and aromatic and aliphatic carboxylic acid ester groups. Ar stands for an aryl residue, such as a benzene, toluene, naphthalene, anthracene, phenanthrene, or like residue in which the group R'—O— is attached to a carbon atom in the same 6-carbon ring of Ar as that by which Ar is attached to the ethylenic carbon atom. The groups R, R'—O— and Ar can, in each case, be the same or different groups.

The first step of treating the phenolic substituted glycol with acid to convert it into a substituted ethylene oxide type of compound, can be carried out by the use of a mineral acid, such as hydrochloric, hydrobromic, sulfuric, phosphoric or similar acid, either in aqueous or in anhydrous solution. For instance, one can use an aqueous solution of hydrochloric acid, or hydrogen chloride in glacial acetic acid can be used.

When the phenolic groups of the original substituted glycol compound are replaced by carboxylic acid ester groups, they remain unchanged by the acid treatment and are present in the oxide. The ester groups of the oxide are difficult to hydrolyze off and replace by phenolic hydroxyl. However, such replacement will occur if the oxide esters are treated in a strongly alkaline medium, such as an alcoholic solution of an alkali metal alcoholate.

In the next step, wherein the oxide is reduced to give a mono-hydric alcohol, active hydrogen is used. For example, one can make use of the nascent hydrogen generated by the action of acids or alkalies on metals, such as reaction of zinc and hydrochloric acid or zinc and sodium hydroxide. Other combinations generating nascent hydrogen can also be used, such as a potassium, sodium, lithium or other alkali metal, or aluminum or magnesium, in the presence of water or aqueous or alcoholic solutions.

By using a strongly acid acylating agent in the final dehydration step, it is possible to use the free phenolic form of the mono-hydric alcohol intermediate and dehydrate to the ethylenic form while simultaneously acylating the phenolic hydroxyls. For example, by using acetic anhydride, benzoic anhydride, propionic acid chloride or similar acid acylating agent, on the free phenolic intermediate, the final product will not only be an ethylenic compound but will also be in its esterified form. However, the process is not limited to the use of carboxylic acid acylating agents in the final dehydrating step, since mineral acids, such as hydrochloric, hydrobromic, sulfuric and phosphoric acids can also be used.

Each of the three main steps of the process can be carried out, either on the free phenolic derivatives or their corresponding esters, with substantially the same results.

The invention can be illustrated by the following examples:

EXAMPLE 1.—*Preparation of diethyl-di-p-hydroxyphenyl ethylene glycol*

Twenty-five grams of para-hydroxypropiophenone are dissolved in 600 cc. of methanol. Twenty-five grams of clean aluminum turnings are treated with mercuric chloride to amalgamate the same and are then added to the ketone solution. The mixture is stirred for six to eight hours while keeping the mixture warm on a steam bath. At the end of this time, the suspension is decanted from undissolved metal and the latter washed with hot methanol. The washings are added to the decanted suspension and most of the alcohol distilled off. The residue from this distillation is mainly α, β-diethyl-α, β-di-p-hydroxyphenyl ethylene glycol. The crystalline glycol can be obtained, in highly purified form, if desired, by taking it up in organic solvents, concentrating the solution and cooling. It may be characterized by its dibenzoate which melts at about 220° C.

In this example, instead of reducing p-hydroxy propiophenone, any other hydroxyaryl alkyl ketone can be used. For example, one can use ortho- and meta-hydroxy propiophenone, hydroxy butyrophenone, hydroxy caprylophenone, ortho-methyl p-hydroxy propionphenone, etc. Furthermore, by reducing a mixture of hydroxyaryl alkyl ketones it is possible to obtain unsymmetrical glycols in which the aryl residues are different, or in which the alkyl substituents differ from one another. One can also obtain unsymmetrical glycols in which the aryl residues and also the alkyl substituents differ from one another. However, reduction of a single ketone, rather than a mixture of ketones, gives only a single symmetrical glycol. This is the simplest variation of the process and is preferred, because separation of the product is easier.

EXAMPLE 2.—*Preparation of diethyl-di-p-hydroxyphenyl ethylene oxide*

The α, β-deithyl-α, β-di-p-hydroxyphenyl ethylene glycol product of Example 1 is acidified with hydrochloric acid, water added, and the mixture boiled until no more alcohol distils off. The residue is extracted with ether and the ether extract washed with dilute hydrochloric acid and then with water. The ether is evaporated off to give α, β-diethyl-α, β-di-p-hydroxyphenyl ethylene oxide. It may be obtained either as an oil or, by treatment with solvents and cooling, as crystals.

EXAMPLE 3.—*Preparation of dibenzoate of diethyl-di-p-hydroxyphenyl ethylene oxide*

The oily α, β-diethyl-α, β-di-p-hydroxyphenyl ethylene oxide is taken up in one liter of 2½% sodium hydroxide solution and shaken with 25 cc. of benzoyl chloride which is added in 5 cc. portions. A crude benzoate forms and is filtered off and the filtrate shaken with 10 cc. more of benzoyl chloride to obtain an additional small quantity of insoluble benzoate. The benzoate is washed with water, triturated with a small amount of ethyl ether, and finally filtered and washed with ether. Any of the benzoate in the ether washings can be recovered by washing out with dilute alkali solution and water and evaporating off the ether. The benzoate can be dissolved in chloroform, filtered, and the filtrate evaporated to a thick solution. Hot alcohol is added to the solution and boiling continued until a large amount of crystalline benzoate separates out. The solution is chilled and then filtered to give crystals of the dibenzoate of α, β-diethyl-α, β-di-p-hydroxyphenyl ethylene oxide, melting at 176–177° C.

EXAMPLE 4.—*Preparation of diethyl-di-p-hydroxyphenyl ethylene*

The dibenzoate is dissolved in a liter of boiling normal propyl alcohol and refluxed over a period of three hours, while adding 50 grams of sodium metal in small portions. After the sodium is completely dissolved, part of the alcohol is distilled off and the residue cooled.

At this point, the residue contains α, β-diethyl-α, β-di-p-hydroxyphenyl ethyl alcohol and can be diluted and directly treated with strong acid to dehydrate the alcohol to its unsaturated ethylenic derivative. Alternatively, the pure alcohol derivative can be obtained as follows. The residue from the sodium and alcohol reduction is diluted with water and dilute hydrochloric acid stirred in slowly until the mixture is only slightly alkaline in reaction. The mixture is then extracted with ether, the ether extract dried with anhydrous magnesium or sodium sulfate and the ether evaporated off to leave an oily residue of α, β-diethyl-α, β-di-p-hydroxyphenyl ethyl alcohol. The oily product can be taken up in solvents, cooled and crystallized to give the pure crystalline compound melting at about 162° C. It can then be converted by acylating agents into its phenolic esters, in which the phenolic hydroxyls are replaced, in whole or in part, by carboxylic acid ester groups.

The pure α, β-diethyl-α, β-di-p-hydroxyphenyl ethyl alcohol or the mixture from the sodium and alcohol reduction is then acidified with an excess of hydrochloric acid (sp. gr. 1.18). The alcohol is distilled off the acidified solution, the solution cooled and extracted with ether. The ether extract is washed with water and evaporated to dryness. The residue is α, β-diethyl-α, β-di-p-hydroxyphenyl ethylene, which is also known as diethyl stilboestrol. It is extremely soluble in acetone, methanol and ethanol, less soluble in benzene and chloroform and insoluble in petroleum ether and carbon tetrachloride. The product can be taken up in methanol, two or three volumes of carbon tetrachloride added and the solution boiled until crystallization starts. The mixture is then chilled and filtered. The product can be recrystallized in a similar manner if desired. It has a melting point of approximately 171° C.

The examples are given merely for purposes of illustrating the invention and not to limit it to the materials and conditions given therein. Other equivalent conditions and compounds may be used, as have already been mentioned above. Thus, the preparation of an ester of the oxide as given under Example 3 is not necessary, since the preparation of the dibenzoate of Example 3 was given because it also illustrates a method of further purifying the oxide of Example 2. Example 3 can therefore be omitted in the process, if desired, and the free phenolic product of Example 2 used as the starting material for Example 4, with substantially the same results.

What I claim as my invention is:

1. Process for the preparation of a di-hydroxyaryl di-alkyl substituted ethylene, wherein an α, β-di-alkyl-α, β-dihydroxyaryl ethylene glycol is treated with strong mineral acid to convert the glycol into its corresponding substituted ethylene oxide, the oxide reduced with active hydrogen to form the corresponding tetra-substituted mono-hydric ethyl alcohol and the latter dehydrated by treatment with strong acid to form the corresponding unsaturated di-hydroxyaryl di-alkyl substituted ethylene.

2. Process for the preparation of a di-hydroxyphenyl di-alkyl substituted ethylene, wherein an α, β-di-alkyl-α, β-dihydroxyphenyl ethylene glycol is treated with strong mineral acid to convert the glycol into its corresponding substituted ethylene oxide, the oxide reduced with active hydrogen to form the corresponding tetra-substituted mono-hydric ethyl alcohol and the latter dehydrated by treatment with strong acid to form the corresponding unsaturated di-hydroxyphenyl di-alkyl substituted ethylene.

3. Process for the preparation of diethyl-di-p-hydroxyphenyl ethylene which comprises treating α, β-diethyl-α, β-di-p-hydroxyphenyl ethylene glycol with strong mineral acid to convert the glycol into its corresponding substituted ethylene oxide, reducing said oxide with active hydrogen to form α, β-diethyl-α, β-di-p-hydroxyphenyl ethyl alcohol and dehydrating the latter by treatment with strong acid to form diethyl-di-p-hydroxyphenyl ethylene.

4. Process for the preparation of a di-hydroxyaryl di-alkyl substituted ethylene which comprises treating α, β-di-alkyl-α, β-di-hydroxyaryl ethylene glycol with a strong mineral acid to convert the same into its corresponding substituted ethylene oxide, reducing said oxide with a lower mono-hydric alcohol and sodium to form the corresponding tetra-substituted mono-hydric ethyl alcohol and dehydrating the latter compound with strong acid to form the corresponding unsaturated di-hydroxyaryl di-alkyl substituted ethylene.

5. α, β-Diethyl-α, β-di-para-hydroxyphenyl ethyl alcohol.

6. An α, β-dialkyl-α, β-dihydroxy aryl substituted ethyl alcohol.

7. An α, β-dialkyl-α, β-dihydroxy phenyl substituted ethyl alcohol.

8. In the process for preparing α, β-diethyl-α, β-di-para-hydroxy phenyl ethylene, the step which comprises dehydrating α, β-diethyl-α, β-di-para-hydroxy phenyl ethyl alcohol by treatment with strong acid.

9. The step which comprises reducing α, β-dialkyl-α, β-di-hydroxyaryl substituted ethylene oxides with active hydrogen to form the corresponding tetra-substituted mono-hydric ethyl alcohols.

10. The step which comprises dehydrating α, β-di-alkyl-α, β-di-hydroxyaryl substituted mono-hydric ethyl alcohols by treatment with strong acid to form the corresponding unsaturated di-alkyl di-hydroxyaryl substituted ethylene.

11. Process for the preparation of a dihydroxy dialkyl substituted ethylene which comprises treating α, β-dialkyl-α, β-dihydroxy aryl ethylene glycol with a strong mineral acid to convert the same into its corresponding substituted ethylene oxide, reducing said oxide with a lower mono-hydric alcohol and an alkali metal to form the corresponding tetra-substituted mono-hydric ethyl alcohol, and dehydrating the latter compound with strong acid to form the corresponding unsaturated dihydroxy aryl dialkyl substituted ethylene.

12. Process for the preparation of α, β- diethyl-α, β-di-para-hydroxy phenyl ethyl alcohol which comprises treating α, β-dialkyl-α, β-dihydroxy aryl ethylene glycol with a strong mineral acid to convert the same into its corresponding substituted ethylene oxide, and reducing said oxide with a lower mono-hydric alcohol and an alkali metal.

FRANK H. TENDICK.